(12) United States Patent
Guo

(10) Patent No.: US 7,796,602 B2
(45) Date of Patent: Sep. 14, 2010

(54) IN SEQUENCE PACKET DELIVERY WITHOUT RETRANSMISSION

(75) Inventor: Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1462 days.

(21) Appl. No.: 10/304,332

(22) Filed: Nov. 25, 2002

(65) Prior Publication Data

US 2004/0100963 A1    May 27, 2004

(51) Int. Cl.
*H04L 12/56* (2006.01)
*H04L 12/54* (2006.01)

(52) U.S. Cl. .................. 370/394; 370/412; 370/429

(58) Field of Classification Search ............... 370/394, 370/412, 428, 429, 230, 231, 235, 236, 389, 370/229; 709/232, 235; 710/52, 57
See application file for complete search history.

(56) References Cited

U.S. PATENT DOCUMENTS

| | | | |
|---|---|---|---|
| 6,330,699 B1 * | 12/2001 | Yoshioka et al. ............ 714/746 |
| 6,487,689 B1 * | 11/2002 | Chuah ........................ 714/748 |
| 6,493,316 B1 * | 12/2002 | Chapman et al. ............ 370/231 |
| 6,738,379 B1 * | 5/2004 | Balazinski et al. .......... 370/394 |
| 6,785,241 B1 * | 8/2004 | Lu et al. ..................... 370/241 |
| 6,967,951 B2 * | 11/2005 | Alfano ........................ 370/394 |
| 7,161,978 B2 * | 1/2007 | Lu et al. ..................... 375/219 |
| 7,187,677 B2 * | 3/2007 | Torsner et al. .............. 370/394 |
| 7,406,082 B2 * | 7/2008 | Nagarajan et al. ........... 370/394 |
| 2003/0108045 A1 * | 6/2003 | Jayam et al. ................ 370/394 |
| 2004/0022262 A1 * | 2/2004 | Vinnakota et al. ........... 370/429 |

OTHER PUBLICATIONS

Technical Specification, ETSI TS 129 060 V4.2.0 (Sep. 2001) GSM-UMTS-GPRS, GPRS Tunneling Protocol (GTPP across the Gn and Gp Interface, 3GPP TS 29.060, version 4.2.0 Release 4), (93 pages).

* cited by examiner

*Primary Examiner*—Aung S Moe
*Assistant Examiner*—Fegen Haile
(74) *Attorney, Agent, or Firm*—Marger Johnson & McCollom, P.C.

(57) ABSTRACT

A method of re-ordering packets receives packets having packet sequence numbers. The method then determines if a packet is an out of window packet and buffers out-of-window packets having a sequence number more than a first number. The method delivers a packet when the packet sequence number matches a first number. It delivers all buffered packets when a timeout occurs. A communication system having at least one network device that performs this method is also disclosed.

6 Claims, 6 Drawing Sheets

Figure 2c
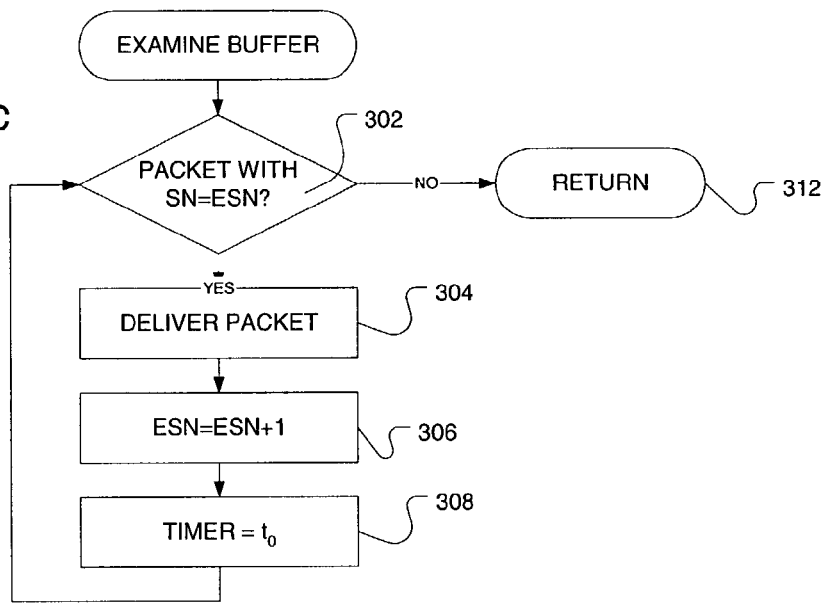
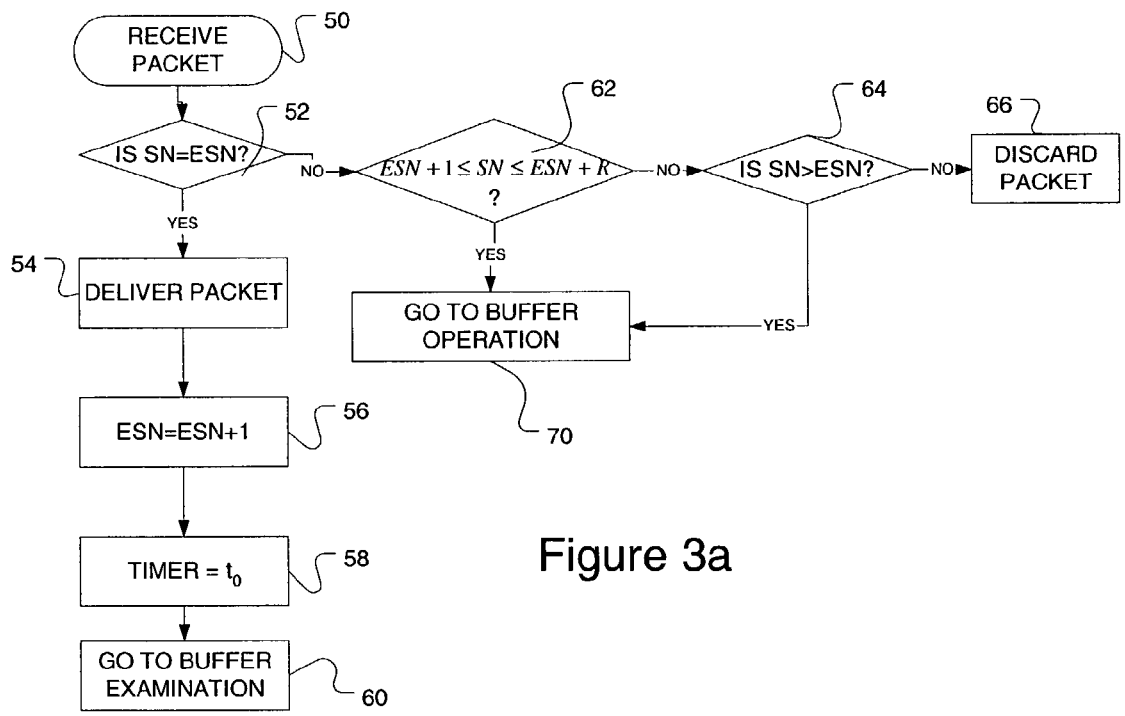
Figure 3a though also has negative impact. Even in a network that successfully routed every packet, waiting too long will delay the delivery of the content and the user will hear discontinuous sound, such as during voice calls, or see frozen frames during video streaming.

IN SEQUENCE PACKET DELIVERY WITHOUT RETRANSMISSION

BACKGROUND

Transmission of multi-media content across a packet network often requires that the content packets be delivered in sequence and in a timely fashion. Packets of a content stream may experience various delay and arrive at the receiving end in a different order than they were transmitted. When that happens, the original content stream must be reconstructed at the receiving end for the transmission to have any meaning. Reconstructing the stream may involve a waiting period during which packets may be received and original transmission order may be restored. However, waiting too long will result in poor quality of service, so some approaches discard packets that are 'too late.' Different protocols address these issues in different ways.

Generally, the transmitting end assigns a sequence number to each outgoing packet. With a distributed network, such as the Internet, where each packet could possibly take a different route with a different number of hops between the transmitting and receiving ends, the packets may arrive out of order or are even lost at an intermediate hop. The receiving end uses the sequence numbers to reconstruct the data stream and provides it to the end user in sequence.

Examples of protocols in which these sequence numbers are used include the Real-time Transport Protocol (RTP) and the General Packet Radio Service (GPRS) Tunneling Protocol (GTP). GPRS is a wireless standard used to provide wireless access to packet networks. GTP provides encapsulation of all the data network protocols to ensure security in the backbone network and to simplify the routing mechanism and the delivery of data over the GPRS network.

Both RTP and GTP use sequence numbers at the transmitting end, but handle the re-sequencing tasks differently on the receiving end. In RTP, individual applications perform the re-sequencing and timely deliver of packets to the processing component. In GTP, the re-sequencing and timely delivery occurs inside the GTP tunnel, without any knowledge of user applications.

BRIEF DESCRIPTION OF THE DRAWINGS

Embodiments of the invention may be best understood by reading the disclosure with reference to the drawings, wherein:

FIGS. 2a-2c show flowcharts of a prior art method of re-ordering packets in different situations.

FIGS. 3a-3c show flowcharts of an embodiment of a method to re-order packets in different situations.

DETAILED DESCRIPTION OF THE EMBODIMENTS

Figure 1:
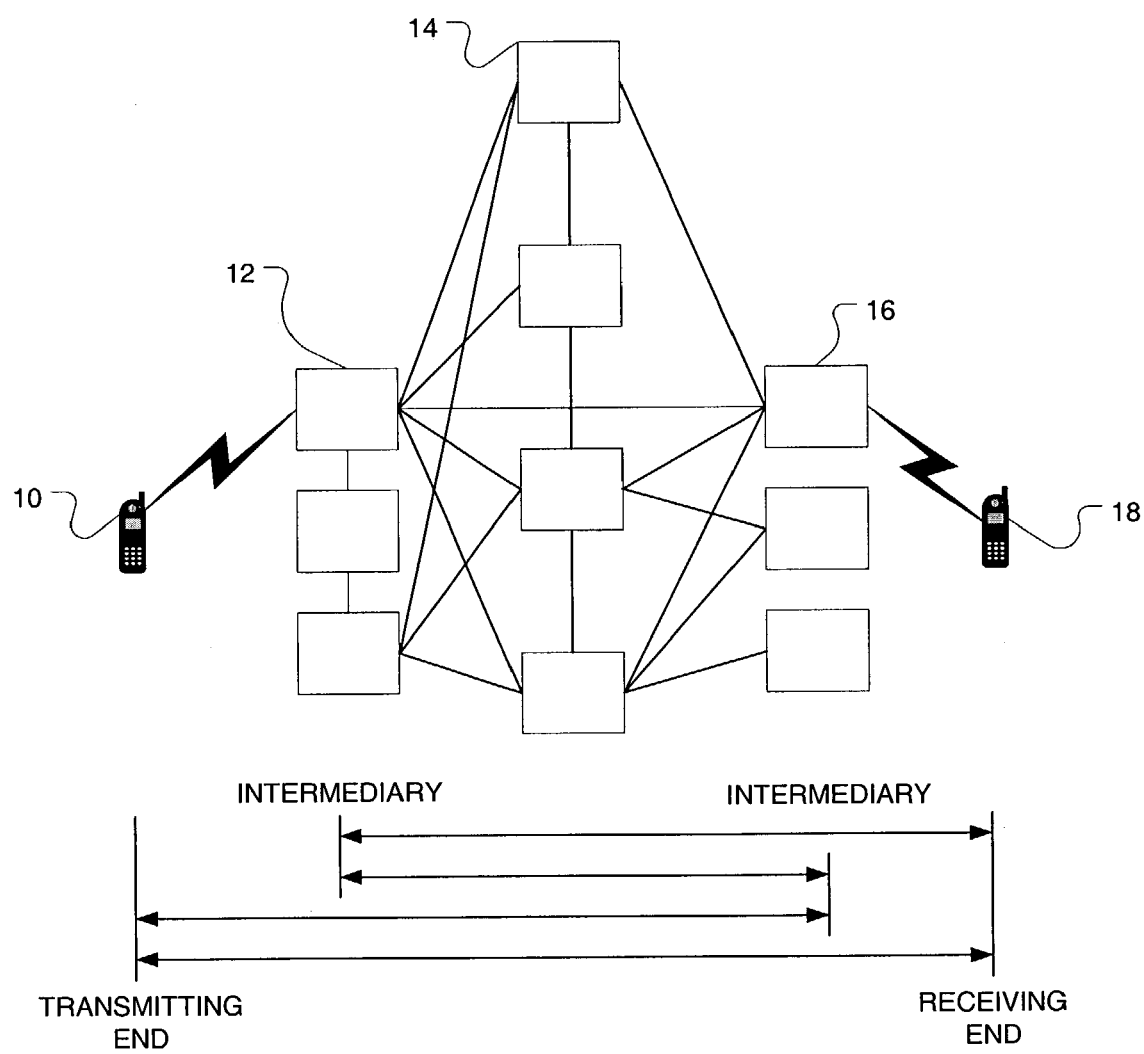
FIG. 1 shows an example of a communication system.

FIG. 1 shows an example of a communication system. The communication system has a transmitting station 10 and a receiving station 18. The transmitting and receiving stations shown are cellular phones or similar devices, but may be any two end points on a packet network that pass traffic back and forth to each other. Similarly, many examples discussed here will use the General Packet Radio System (GPRS) Tunneling Protocol (GTP) as the tunneling protocol between these two systems, but embodiments of this invention may be used by any protocol that re-orders packets prior to delivery to an application.

In FIG. 1, for example, the user at the transmitting station 10 may be sending audio packets across the network. As it is a distributed packet network, such as the Internet, packets from the same audio stream may take several different routes before arriving at the receiving station 18. For example, a first packet may travel from intermediate device 12, such as a server or router, to another intermediate device 14, to yet another intermediate device 16, before being transmitted to the receiving station 18. A second packet in the transmitting sequence may travel directly from the intermediate device 12 to the intermediate device 16, arriving at the receiving station 18 prior to the first packet. These packets would then need to be re-ordered prior to delivery, so as to properly reconstruct the data stream as it was transmitted.

A typical example of a protocol that re-orders packets is the Real-time Transport Protocol (RTP). In RTP, the transmitting station assigns a sequence number to each outgoing packet. RTP typically transports packets using the User Datagram Protocol (UDP) over an Internet Protocol network. RTP packets may be lost or arrive out of order. At the receiving station, RTP packets are immediately delivered to a user application that relies upon the sequence number to re-order the applications. In RTP, the application is responsible for achieving in-sequence and timely process of the packets.

Other protocols have been developed to carry data messages in third generation (3G) wireless networks. In particular, GTP has been designed to tunnel data messages in the Core Network of a 3G wireless network. The Core Network of a 3G network is generally a core network, such as an IP backbone, with the addition of Radio Network Controllers (RNC), Serving GPRS Support Nodes (SGSN) and Gateway GPRS Support Node (GGSN). RNCs relay packets between the wireless network and the core network; SGSNs perform mobility management functions such as mobile subscriber attach/detach and location management. GGSNs provide interfaces to external IP networks, such as the Internet, other service providers' GPRS services or enterprise intranets.

Unlike RTP, GTP tunnels deployed in these types of network environments re-order the packets prior to delivery to the user application. It must be noted that while GTP provides a good example in which to discuss embodiments of the invention, the embodiments are applicable to any protocol that re-orders the packets in this manner.

Re-ordering packets prior to delivery to the user application has two major implications that the protocol must address. Since the GTP protocol does not include any feedback messages to notify a transmitting station of packets that have or have not been received, it is impossible for the sender to know which packets should be re-transmitted. Without retransmission, a lost GTP packet is a packet forever lost.

Additionally, although a receiver can recognize an out-of-sequence packet by detecting the non-contiguousness among the sequence numbers of received packets, it cannot tell if the packet was lost or is merely 'late.' With the heterogeneous characteristic of the various underlying P networks, it is difficult for a receiver to determine when to stop waiting on a lost/delayed packet and deliver those packets that it does have. If the receiver waits for too short a time, the protocol may pass on packets too soon, forcing it to discard late packets later. The user application would receive incomplete content data and the quality of service will suffer. Waiting too long a time may violate the delivery timeline to the user application; consequently the quality of service will also suffer.

The current GTP implementation has a solution for in-sequence delivery. Data messages are delivered within GTP tunnels, which means that GTP encapsulation is used to encapsulate all the packets passing through the tunnel from one end to the other. Each user application is assigned a unique tunnel. In-sequence delivery is supported on a per-tunnel basis. Tunnels are configured for in-sequence delivery upon establishment of the tunnel. Within the tunnel, the in-sequence delivery has three relevant parameters. The first is the expected sequence number (ESN), the sequence number of the next in-sequence GTP packet, which may also be referred to as the 'first' number.

The second tunnel parameter is the receiving window size (R), denoting a contiguous range of sequence numbers starting at ESN+1. For a receiving window of size R, packets whose sequence number is inside the range [ESN+1, ESN+R] are considered in-window packets. Otherwise, they are considered out-of-window packets. Note that the actual value of ESN is not in the window, as the packets with a sequence number (SN) matching the ESN is immediately delivered and no window analysis is required. For example, if ESN=10 and R=5, in-window packets would be those with sequence numbers between SN=11 (ESN+1) and SN=15 (ESN+R).

The third relevant tunnel parameter for in-sequence delivery is the timeout value (t0). This is the maximum delay the tunnel will wait on the arrival of the next in-sequence packet, the packet having an SN=ESN. The tunnel allocates enough space in a buffer to store all in-window packets and starts an ESN timer with a value of $t_0$. The device having the buffer may be the receiving device 18 in FIG. 1. However, any device that requires re-ordering for whatever reason may have the tunnel allocate buffer space within it.

As can be seen in FIG. 1, re-ordering may be done between an intermediate device, or intermediary and the receiving station, between two intermediaries, between the transmitting device and an intermediary, and between the two ends of the tunnel. Therefore, the network device in which the re-ordering is performed may be an intermediate device or a device located at the receiving end.

Figure 2A:
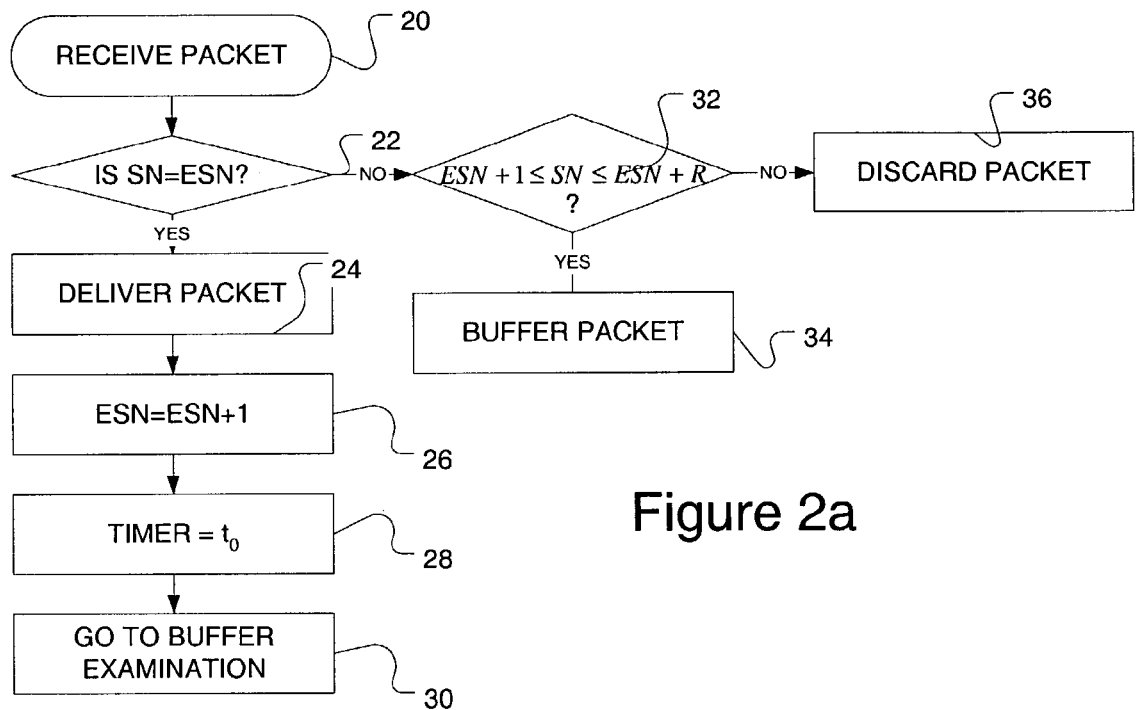
Figure 2B:
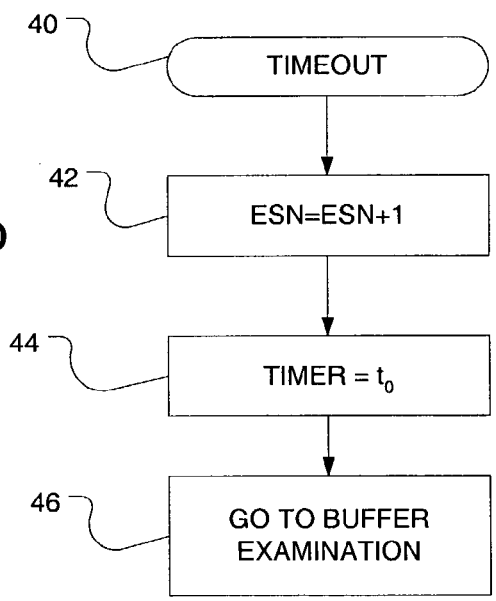

FIGS. 2a through 2c show a current implementation of the GTP re-ordering using a receiving window in flowchart form. FIG. 2a shows the current process for receiving a packet, FIG. 2b shows the current process upon a timeout, and FIG. 2c shows a buffer examination process to determine if a packet should be delivered. It must be noted in FIGS. 2a through 2c and 3a through 3c that these various processes may be going on simultaneously. For example, the system will be receiving packets and processing them while monitoring the timer for timeout. The buffer examination process may be occurring in one part of a network device, while another is receiving packets. The division of these operations into separate flowcharts is only to assist in the understanding of the embodiments of the invention.

In FIG. 2a, a packet is received at 20. The sequence number (SN) of the packet is checked to see if the SN equals the expected packet number (ESN) at 22. If the packet is the expected packet, that is SN=ESN, the packet is delivered at 24. The ESN is advanced by one at 26, the timer is reset at 28, and the process would move to examining the contents of the buffer to determine if there are now deliverable packets in the buffer at 30.

Returning to 22, if the packet is not the expected packet, the process determines whether the sequence number is within the window between the ESN+1 and ESN+R. For example, if the receiving window if 5 (R=5), and the ESN is 10, the sequence number is checked to see if it is between 11 (ESN+1) and 15 (ESN+R), inclusive, at 32. If the sequence number is in this window, the packet is an in-window packet and the packet is buffered at 34.

Returning to 32, where the packet is determined to be either in the window or out-of-window, if the sequence number is not in the window, then the packet is discarded at 36. For packets with sequence numbers less than the ESN, this does not cause problems as these packets are 'late.' However, this approach discards packets with sequence numbers outside the window and higher than the ESN, which leads to a situation referred to as the snowball-delay-effect.

For the first lost packet, or a packet experiencing excessive delay, the GTP protocol has to wait for one timeout before delivering the packets it has. However, during this one timeout, ESN is not updated, and multiple packets could arrive. These packets could potentially be considered out-of-window and discarded. After the timeout, when ESN is advanced into those "artificially discarded" packets, the GTP protocol now has to wait for multiple timeouts (one timeout for each of those discarded packets). During the multiple timeouts even more out-of-window packets may arrive and be potentially dropped. The delay period observed by the application keep increasing, hence a "snowball" effect. In general, whenever an out-of-window packet is dropped, the GTP protocol will have to wait for a timeout in the future in order to advance ESN pass that packet. If more than one packet are dropped during a timeout, a snowball-delay-effect could occur. This will cause significant deterioration in timely delivery and negative impact on quality of service.

The current implementation of GTP handles a timeout event as is shown in FIG. 2b. When the timer expires at 40, the ESN is advanced at 42 and the timer reset at 44. The process then moves to buffer examination at 46. The only way this implementation advances the ESN when a packet is lost or experiences excessive delay is through timeout.

For example, if the ESN=10 and R=5, assume that the packet with SN=10 is lost. The process waits until timeout, filling the buffer with SNs 11, 12, 13, 14 and 15. Meanwhile, packets with SNs of 16, 17 and 18 arrive, and as they are out-of-window packets, they are discarded. When timeout occurs, ESN is advanced to 11 and the buffer is examined. The packet with SN=11 is then delivered and the ESN is advanced to 12. Upon reexamination of the buffer, packets with SNs of 12, 13, 14 and 15 are delivered.

After delivery of packet 15, the ESN is set to 16. Since the $16^{th}$ packet is not in the buffer, the tunnel must wait for a timeout. But the $16^{th}$ packet has been discarded, so upon finishing the timeout, the ESN is advanced and the tunnel begins to wait for packet 17. The process repeats itself.

The determination of any deliverable packets is shown in FIG. 2c. At 302, packets in the buffer are checked to see if they are the next packet that can be delivered in sequence. If such packet is found in the buffer, it is delivered at 304. The ESN is advanced at 306 and the timer is reset at 308. If the expected packet is not in the buffer, the process returns at 312.

One suggested solution to avoid the snowball-delay-effect is to increase the receiving window size. The current GTP specification (GSM-UMTS-GPRS, GPRS Tunneling Protocol (GTP) across the Gn and Gp Interface, 3GPP TS 29.060, September 2001) suggests a receiving window of 8192 packets. With 2K bytes per packet, the network device would have to allocate 16 Megabytes (MB) of buffer space for one tunnel. In some 3G networks, a termination point for GTP tunnels, such as a Radio Network Controller (RNC), may host tens of thousands of tunnels. It is therefore impractical to use that large of a receiving window for each tunnel. Fundamentally, while a larger R value reduces the chance of snowball-delay-effect, it does not eliminate the possibility, as out-of-window packets may still be discarded and cause snowball-delay-effect.

Figure 3B:
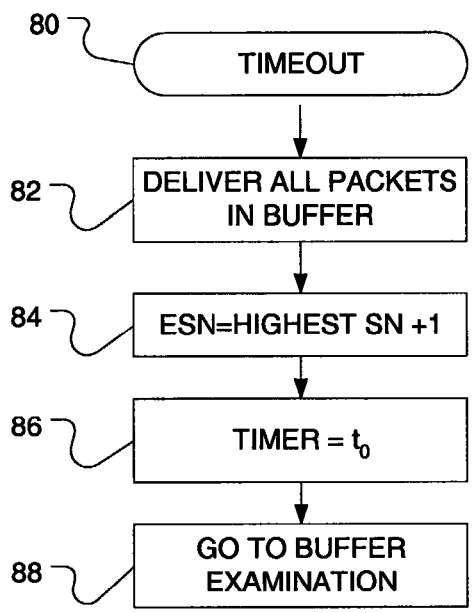
Figure 3C:
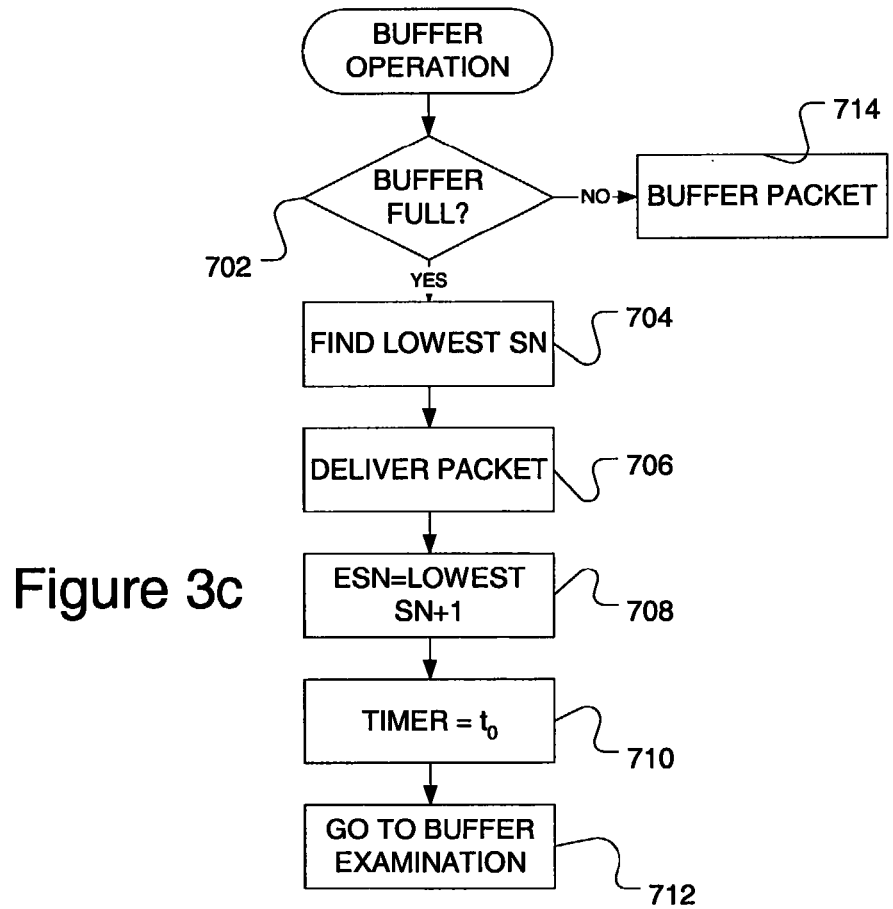

FIG. 3a shows an embodiment of the invention in flowchart form for the process of receiving a packet. FIG. 3b shows an embodiment of the invention for processing a timeout, and FIG. 3c shows an embodiment of a buffer operation. In FIG. 3a a packet is received at 50. The sequence number is checked to see if it is the expected sequence number at 52. If the packet is the expected packet, it is delivered at 54, the ESN is advanced at 56 and the timer is reset at 58. At 60, the process moves to buffer examination, which is the same as that of the prior art discussed with reference to FIG. 2c.

Returning to 52, if the packet is not the expected packet, the sequence number is checked to see if the packet is an in-window packet at 62. If the packet is an in-window packet, the process moves to a buffer operation at 70, which will be discussed with reference to FIG. 3c. If the packet is an out-of-window packet, the sequence number is checked to see if it is greater than the ESN at 64. If the packet is greater than the ESN at 64, then the process moves to a buffer operation to allow the process to buffer that packet. If the sequence number is less than the ESN, the packet is discarded at 66.

FIG. 3b shows an embodiment of a process to handle a timeout during the packet reordering process. If a timeout occurs at 80, all of the packets in the buffer are delivered, regardless of any missing packets. The ESN is then set to the highest sequence number of the delivered packets plus one. The timer is reset at 86. The buffer examination process at 88 may not be necessary, as the buffer was just emptied. However, the possibility exists that a packet could be buffered during delivery of the previously buffered packets.

In this manner, if a packet is received that is an out-of-window packet and the sequence number is greater than ESN, that packet is buffered. When ESN is advanced, such as when the expected packet is received and delivered, eventually that out-of-window packet will become an in-window packet or the expected packet and will be delivered. This avoids discarding a packet that would later cause the snowball-delay-effect to occur.

In order for the process shown in FIG. 3a to avoid having expanding memory requirements, a buffer management process may be implemented. In the previous implementation of FIG. 2, there was no issue with buffer management, as only in-window packets were buffered. However, with the possibility of buffering out-of-window packets in the same size buffer, some form of buffer management is necessary. An embodiment of a buffer management operation is shown in FIG. 3c.

At 702, the process determines if the buffer is full at 702. If the buffer is not full, the packet is buffered at 714. If the buffer is full, the process determines the lowest sequence number of the current packet and the packets in the buffer at 704. For example, if packets 12, 13, 14, 16, and 17 were in the buffer and packet 15 is received, the lowest sequence number would be 12. This packet is then delivered at 706 and the ESN is advanced to 13 at 708, which is the lowest sequence number plus one. The timer would be reset at 710 and then the process would move to buffer examination at 712.

Figure 4:
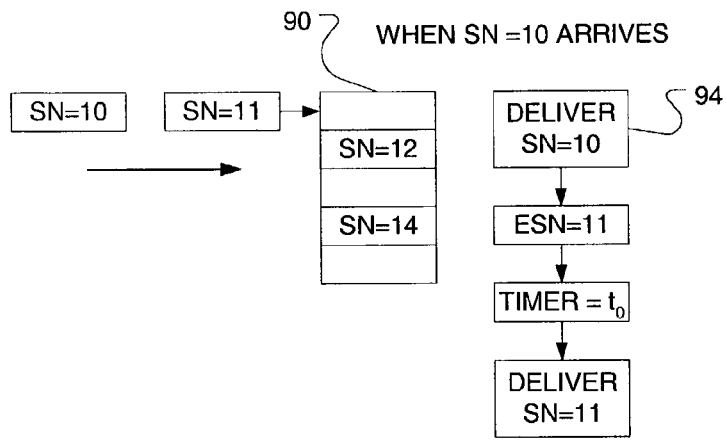
FIG. 4 shows a block diagram of a packet sequence in relation to a hybrid window.

The process discussed in FIG. 3 can now be shown in three different scenarios: no packets lost or out-of-window; out-of-window packets; and lost packets. FIG. 4 shows a block diagram depiction of incoming packets, with the buffer represented by the stack of packets, the initial window in the buffer at 90. Initially, ESN=10, and R=5, so the window is from 11 to 15. As can be seen, packets with sequence numbers of 12 and 14 are buffered, as they are in-window packets. Upon its arrival, the packet with the sequence number 11 will be buffered.

When the packet with the sequence number of 10, which is the ESN, arrives, the process is as shown at 94, with that packet being delivered, the ESN being advanced by one, and the timer reset. The buffer is then examined, the packet with the SN=ESN=11 is then delivered and the process repeats. No packets are discarded in this scenario, and the snowball-delay-effect does not occur.

Figure 5:
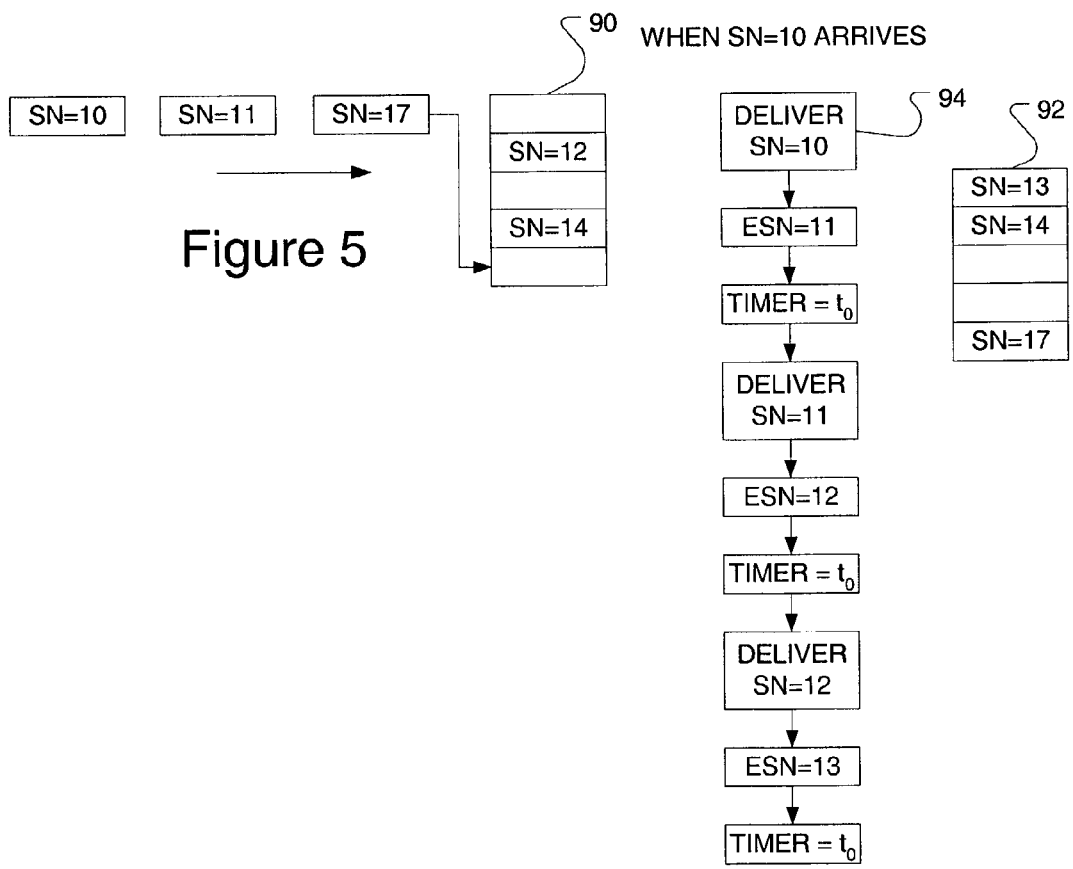
FIG. 5 shows a block diagram of an alternative packet sequence in relation to a hybrid window.

FIG. 5 shows an example of the process when out-of-window packets arrive. Just before the arrival of the packet with the sequence number 17, the buffer is populated with packets having sequence numbers 12 and 14. ESN is again 10 and R is also 5 with the window position again being 90. When the packet arrives having the sequence number 17, it is buffered, whether the buffer has to be examined for overflow or not. When the expected packet with SN=ESN=10 arrives, the process progresses as shown on the right side. The packet with SN=10 is delivered, ESN is set equal to 11, and the timer is reset. The packet with SN=11 is delivered from the buffer, the ESN is set equal to 12 and the timer is reset. This continues until the ESN is set equal to 13. As can be seen from the new window 92, the packet with sequence number equal to 17 is now an in-window packet.

The tunnel will deliver a packet at the earliest of the following events: the expected packet arrives, a packet having a sequence number R+1 needs to be buffered and the buffer is full, or the timer expires. The delivery delay in this process has an upper bound of a single timeout, unlike the previous process in which several timeouts could occur in a row before a packet is delivered.

Figure 6:
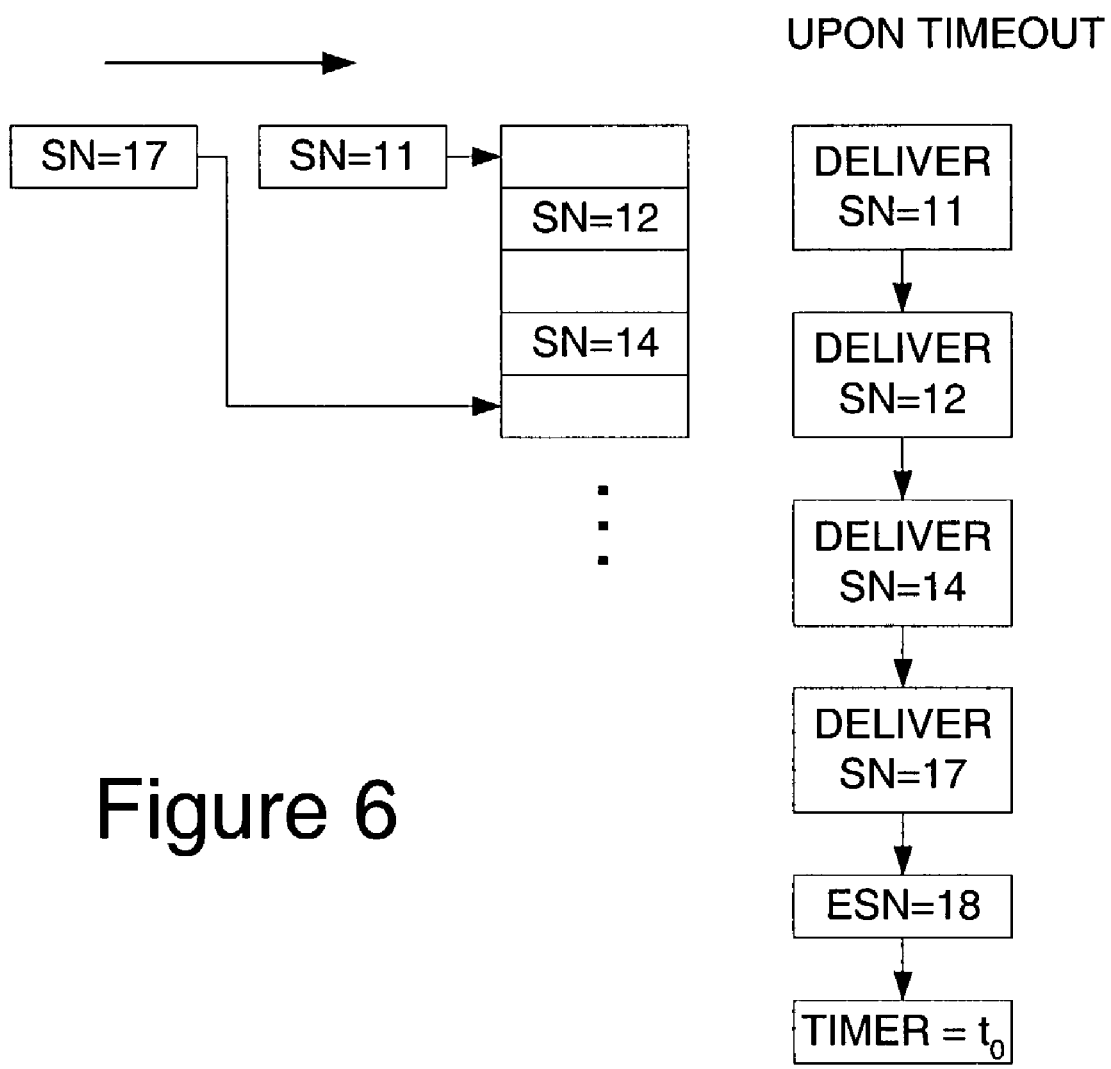
FIG. 6 shows a block diagram of an alternative packet sequence in relation to a hybrid window.

Finally, the case of a lost packet is shown in FIG. 6. The expected packet having a sequence number of 10 never arrives and the timer times out. In that case, the buffered packets of 11, 12, 14, and 17 are delivered and the timer is reset. This again emphasizes that this embodiment of the invention has an upper bound on delays of a single timeout. The snowball-delay-effect has been avoided.

Referring back to FIG. 1, the embodiments of the invention could be implemented in several ways. One of the intermediaries between the transmitting and receiving stations in the system could be replaced with a device that performs this type of re-ordering. Alternatively, a network device could be upgraded with machine-accessible data, that when accessed, causes the network device, or machine, to perform the methods of embodiments of the invention. The communication system shown in FIG. 1 would then include a device that re-ordered packets as discussed above.

Thus, although there has been described to this point a particular embodiment for a method and system to deliver packets in-sequence and in a timely fashion, it is not intended that such specific references be considered as limitations upon the scope of this invention except in-so-far as set forth in the following claims.

What is claimed is:

1. A method of re-ordering packets, the method comprising:

establishing tunnel parameters between a transmitting station and a receiving station, the tunnel parameters comprising an expected sequence number, a window size parameter, and a timeout value;

receiving a plurality of packets of a data stream at a receiving station, each of the packets having a packet sequence number indicating a position of the packet in the data stream;

determining if the packet sequence number of a first packet is equal to the expected sequence number;

delivering the first packet when the packet sequence number is equal to the expected sequence number;

determining if the packet sequence number of the first packet is out-of-window when the packet sequence number is not equal to the expected sequence number, wherein determining if the packet sequence number is out-of-window includes comparing the packet sequence number of the first packet to a window check parameter comprising the expected sequence number added to the window size parameter, the window size parameter having a predetermined and fixed value;

buffering the first packet if the first packet is in-window, wherein the tunnel allocates enough space in the buffer to store all in-window packets;

checking the buffer when the first packet is in-window and the packet sequence number is less than the window check parameter, wherein checking the buffer comprises starting a timer with the timeout value, the timeout value comprising a maximum delay the tunnel will wait on an arrival of a next in-sequence packet for in-sequence delivery;

buffering the first packet if the first packet is out-of-window;

checking the buffer when the first packet is out-of-window and the packet sequence number is greater than the window check parameter, wherein checking the buffer includes:
  determining if the buffer is full;
  buffering the first packet when the buffer is not full; and
  when the buffer is full:
    determining a lowest sequence number in the buffer;
    delivering only a packet having the lowest sequence number; and
    advancing the expected sequence number to an updated number comprising the lowest sequence number plus one; and discarding the first packet when the first packet is out-of-window and the packet sequence number is less than the expected sequence number.

2. The method of claim 1, the method further comprising:

delivering all packets in the buffer upon expiration of the timer;

advancing the expected sequence number to a second number; and resetting the timer.

3. The method of claim 2, wherein the second number is equal to a highest sequence number in the buffer before delivering all packets plus one.

4. An apparatus for re-ordering packets, the apparatus comprising:

means for establishing tunnel parameters between a transmitting station and a receiving station, the tunnel parameters comprising an expected sequence number, a window size parameter, and a timeout value;

means for receiving a plurality of packets of a data stream at a receiving station, each of the packets having a packet sequence number indicating a position of the packet in the data stream;

means for determining if the packet sequence number of a first packet is equal to the expected sequence number;

means for delivering the first packet when the packet sequence number is equal to the expected sequence number;

means for determining if the packet sequence number of the first packet is out-of-window when the packet sequence number is not equal to the expected sequence number, wherein determining if the packet sequence number is out-of-window includes comparing the packet sequence number of the first packet to a window check parameter comprising the expected sequence number added to the window size parameter, the window size parameter having a predetermined and fixed value;

means for buffering the first packet if the first packet is in-window, wherein the tunnel allocates enough space in the buffer to store all in-window packets;

means for checking the buffer when the first packet is in-window and the packet sequence number is less than the window check parameter, wherein checking the buffer comprises starting a timer with the timeout value, the timeout value comprising a maximum delay the tunnel will wait on an arrival of a next in-sequence packet for in-sequence delivery;

means for buffering the first packet if the first packet is out-of-window;

means for checking the buffer when the first packet is out-of-window and the packet sequence number is greater than the window check parameter, wherein checking the buffer includes:
  determining if the buffer is full;
  buffering the first packet when the buffer is not full; and
  when the buffer is full:
    determining a lowest sequence number in the buffer;
    delivering only a packet having the lowest sequence number; and
    advancing the expected sequence number to an updated number comprising the lowest sequence number plus one; and means for discarding the first packet when the first packet is out-of-window and the packet sequence number is less than the expected sequence number.

5. The apparatus of claim 4, the apparatus further comprising:

means for delivering all packets in the buffer upon expiration of the timer;

means for advancing the expected sequence number to a second number; and means for resetting the timer.

6. The apparatus of claim 5, wherein the second number is equal to a highest sequence number in the buffer before delivering all packets plus one.

* * * * *